Patented Jan. 28, 1941

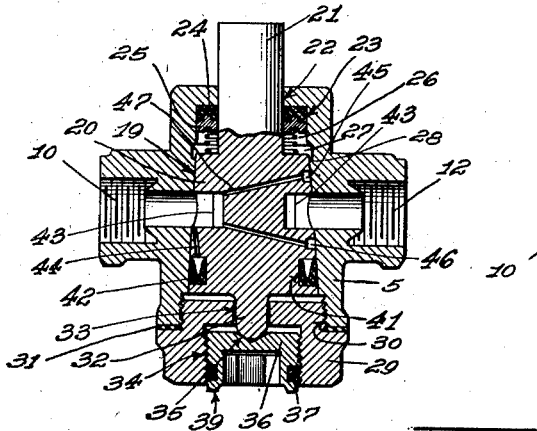

2,229,932

UNITED STATES PATENT OFFICE 2,229,932

VALVE

Arthur L. Parker, Cleveland, Ohio

Application July 22, 1938, Serial No. 220,784

1 Claim. (Cl. 251—112)

The invention relates generally to valves intended for use in high pressure hydraulic circuits and has for an object to provide a novel valve structure including a tapered rotary plug, novel sealing means for preventing leakage about the plug, novel means for directing fluid from a high pressure side of the plug to a low pressure side thereof in order to facilitate turning and minimize wearing of the plug, and novel means directing fluid pressure from a high pressure side of the valve to the sealing means to render the same increasingly efficient as the demand for sealing efficiency increases.

With the above and other objects in view which will more fully appear, the nature of the invention will be more clearly understood by following the description, the appended claim, and the several views illustrated in the drawing.

In the drawing:

Figure 1 is a central vertical section of the valve.

Figure 2 is a central horizontal section of the valve.

Figure 3 is a detail side elevation and part vertical section of the valve plug.

Figure 4 is a detail vertical section of the socket screw plug.

Figures 5 and 6 are diagrammatic horizontal sections illustrating the valve connected in a high pressure hydraulic system.

The improved valve includes a casing 5 and in this particular disclosure is a valve of the 4-way type adaptable to use in a high pressure hydraulic system such as might be employed in hydraulic presses. In such a system there is included a cylinder 6 having a piston 7 mounted for reciprocation therein, a pump 8 for applying hydraulic pressure alternately at opposite sides of the piston under control of the valve forming the subject matter of this application, and a tank 9 in which the pressure fluid is impounded.

The valve casing 5 includes a high pressure inlet 10, which may be connected by a line 11 with the pressure side of the pump, and a low pressure outlet 12 which may be connected by a line 13 with the tank, said tank being connected by a line 14 with the pump intake. The valve casing also includes outlets 15 and 16 which may be alternately connected through lines 17 and 18 with the respective ends of the cylinder for alternately directing fluid into said cylinder ends at the high pressure developed by the pump. The high pressure hydraulic circuit is diagrammatically illustrated in Figures 5 and 6 of the drawing.

The valve casing includes a tapered bore 19 in which a tapered valve plug 20 is rotatably adjustable, the stem 21 of the plug being extended from the small end of the plug through an opening 22 in the casing. Within the casing the stem opening 22 is surrounded by a counterbore 23 in which is mounted a packing ring 24 formed of any suitable yieldable composition material. The packing ring is opposed by a metal spreader ring 25, and a coil spring 26 is interposed between the small end of the plug and the ring 25 and serves to constantly urge the ring 25 into spreading engagement with the yieldable packing ring.

At its small end the plug is surrounded by a pressure chamber 27 which extends slightly below the extremity of the plug as at 28.

A closure cap 29 is threadably mounted as at 30 in the lower end of the casing, a suitable gasket 31 being interposed between the cap and the end of the casing.

The plug has a depending bearing stem 32 having a rounded end which projects through a center bore 33 in the valve casing cap and into a threaded counterbore 34 formed in the cap. The rounded end of the stem 32 engages a bearing seat 35 formed in a socket screw plug 36 adjustably mounted in the threaded counterbore. A washer 37 of suitable yieldable composition material is mounted in a groove 38 formed in the plug 36 and is secured in the groove by upsetting the metal of said plug. The external surface 40 of the washer is normally non-threaded and threads are cut into said surface during the mounting of the plug. By thus forcing the washer into the receiving threads of the counterbore the washer is made to effectively seal the counterbore against fluid leakage and also to act as a lock washer preventing loss of adjustment of the screw plug 36.

An annular groove 41 is formed in the lower or large end of the valve plug and within this groove is mounted a flexible composition material sealing ring 42 which is U-shaped in cross section and has the open portion or legs of the U directed upwardly.

The valve plug is provided with side cutouts 43 for alternately communicating between the valve outlets 10, 15 and 12, 16, or 12, 15 and 10, 16, as indicated in Figures 5 and 6 of the drawing, and the duct 44 formed in said plug affords communication between the side cutout 43 at the high pressure side of the valve and the space within the sealing ring 42.

The valve plug also includes side cutouts 45 and 46 respectively formed in the external surface of the plug above and below the side cutouts 43 of the low pressure side of the valve, and each of these cutouts 45 and 46 communicates through a duct 47 with the side cutout 43 at the high pressure side of the plug.

By reason of the provision of the cutouts 45 and 46 at the low pressure side of the valve, and the ducts 47 communicating with the high pressure line, the high pressure within said line which would normally tend to force the valve plug into engagement with the casing at the low pressure side and thereby cause the plug to turn hard and wear quickly is balanced and the plug is permitted to turn freely and excessive wear is avoided.

By reason of the provision of the particular form of sealing ring 42 and the pressure communicating duct 44 the high pressure within the line 11 is utilized to spread the sealing ring and the sealing efficiency of the ring is thus increased as the demand for sealing efficiency increases because of increase of pressure in said line.

Any pressure which tends to build up above the valve plug due to leakage of fluid about the plug will augment the pressure of the spring 26 tending to unseat the valve plug and the plug will be free to pivot about the center bearing provided by reason of the engagement of the plug stem 32 with the seat formed in the screw plug 36.

It is of course to be understood that the details of structure and arrangement of parts may be variously changed and modified without departing from the spirit and scope of my invention.

I claim:

In a valve, a casing having a plug chamber, a high pressure inlet and a low pressure outlet, a tapered plug rotatably adjustable in the plug chamber and having a stem projecting from its small end, said casing having a bore therein through which said stem projects and a counterbore surrounding the stem, a deformable gasket ring surrounding the stem in said counterbore, a spreader ring in said counterbore and having provision for spreading the gasket ring to seal the bore against leakage about the stem, and spring means constantly pressing the spreader ring against the gasket ring and also cooperating with such fluid as might leak past the small end of the plug and accumulate pressure thereabove in tending to unseat and prevent hard turning of said plug, an annular pressure duct in the large end of the plug, a U-shaped sealing gasket in the pressure duct, and means for providing communication between the high pressure inlet and the duct whereby fluid at high pressure will engage and spread the gasket into sealing contact with portions of said plug and casing.

ARTHUR L. PARKER.